US012229320B1

(12) United States Patent
Owens (10) Patent No.: US 12,229,320 B1
(45) Date of Patent: Feb. 18, 2025

(54) PDF TRACKING FOR LOCAL EDITING AND DIGITAL SIGNING FOR APPLICATIONS

(71) Applicant: UXSTORM, LLC, Damascus, MD (US)

(72) Inventor: Reed Wentworth Owens, Damascus, MD (US)

(73) Assignee: UXSTORM, LLC, Damascus, MD (US)

( * ) Notice: Subject to any disclaimer, the term of this patent is extended or adjusted under 35 U.S.C. 154(b) by 165 days.

(21) Appl. No.: 17/985,793

(22) Filed: Nov. 11, 2022

(51) Int. Cl.
  G06F 21/64 (2013.01)
  G06F 21/60 (2013.01)
(52) U.S. Cl.
  CPC ............ G06F 21/64 (2013.01); G06F 21/602 (2013.01); G06F 2221/2107 (2013.01)
(58) Field of Classification Search
  None
  See application file for complete search history.

(56) References Cited

U.S. PATENT DOCUMENTS

| | | | | |
|---|---|---|---|---|
| 2003/0106017 A1* | 6/2003 | Kanchirayappa | ..... | G06F 16/258 715/229 |
| 2012/0066306 A1* | 3/2012 | Leacock | ................ | G06Q 50/01 709/204 |
| 2017/0195309 A1* | 7/2017 | Schmalz | ................. | H04L 63/06 |
| 2020/0076593 A1* | 3/2020 | Pyo | ....................... | G06F 21/602 |
| 2020/0159954 A1* | 5/2020 | Pomerance | ........... | G16H 10/60 |
| 2021/0294543 A1* | 9/2021 | Schenk | ................. | G06F 3/1284 |
| 2022/0171758 A1* | 6/2022 | Agrawal | ............ | G06F 16/2343 |
| 2022/0303233 A1* | 9/2022 | Tamura | ................. | G06F 16/162 |

* cited by examiner

*Primary Examiner* — Raqiul A Choudhury
(74) *Attorney, Agent, or Firm* — Oliver Edwards; Law Office of Oliver Edwards LLC (57) ABSTRACT

The present invention pertains to an application server system and method for verifying the provenance of a candidate electronic file, such as a Portable Document File, in a workflow whereby an electronic document is encoded with a hidden annotation having a key unique to the workflow and/or document. After the document is resubmitted with form changes and/or signatures from a client device, the resubmitted document is searched for the hidden annotation and unique key and that is compared to the originally generated unique key to determine whether the document is eligible for continued processing.

8 Claims, 7 Drawing Sheets

Agreement

Nec ullamcorper sit amet risus. Magna eget est lorem ipsum dolor sit amet. Congue mauris rhoncus aenean vel.

Lorem ipsum dolor sit amet, consectetur adipiscing elit, sed do eiusmod tempor incididunt ut labore et dolore magna aliqua. Urna neque viverra justo nec ultrices. Accumsan in nisl nisi scelerisque eu ultrices. Vel orci porta non pulvinar neque laoreet suspendisse. Viverra mauris in aliquam sem fringilla ut morbi tincidunt. Maecenas ultricies mi eget mauris pharetra et ultrices neque. Magna fermentum iaculis eu non diam. Nec ullamcorper sit amet risus. Magna eget est lorem ipsum dolor sit amet. Congue mauris rhoncus aenean vel.

Nam at lectus urna duis. Vitae nunc sed velit dignissim. Suspendisse in est ante in nibh. Euismod lacinia at quis risus sed. Tortor at auctor urna nunc. Ornare suspendisse sed nisi lacus sed viverra tellus in hac. Aliquam vestibulum morbi blandit cursus risus at. Felis eget velit aliquet sagittis id consectetur purus. Morbi tincidunt ornare massa eget. Lorem sed risus ultricies tristique nulla aliquet enim tortor. Enim ut sem viverra aliquet eget sit amet tellus cras. Cursus risus at ultrices mi tempus imperdiet nulla malesuada. Odio morbi quis commodo odio. Nunc eget lorem dolor sed viverra ipsum. Sapien nec sagittis aliquam malesuada bibendum arcu vitae. Arcu dui vivamus arcu felis bibendum ut tristique et egestas. Viverra justo nec ultrices dui. Parturient montes nascetur ridiculus mus mauris vitae ultricies leo. Purus non enim praesent elementum facilisis leo vel fringilla est. Lacus sed turpis tincidunt id aliquet risus feugiat.

The undersigned agree to all the conditions above:

The First Organization:

210 — Representative Name: ______
Address: ______
Telephone: ______ Email: ______ Date: ______

215 — Representative Signature: ______

The Second Organization:

220 — Representative Name: ______
Address: ______
Telephone: ______ Email: ______ Date: ______

225 — Representative Signature: ______

| PDF Document Identifier | UUID | Generated PDF Contents | Processed |
|---|---|---|---|
| F1 | PDF Form 1 | ... | TRUE |
| F1 | PDF Form 2 | ... | FALSE |
| F2 | PDF Form 3 | ... | FALSE |
| F3 | 67255b06ed0cb394d8e10c0ab2e2909a5eae4835 | ... | FALSE |

```
<<
    /Type       /Annot
    /Subtype    /Text
    /NM         (Unique-Name)
    /Contents   (UUID)
    /F          2
>>
```

FIG. 10

```
<<
    /Type           /Annot
    /Subtype        /Square
    /Subj           (Rectangle)
    /Rect           [0 792 2 794]
    /NM             (Unique-Name)
    /TrnCustomData  (UUID)
    /F              2
>>
```

FIG. 11

```
<<
    /Type           /Annot
    /Subtype        /Square
    /Subj           (Rectangle)
    /Rect           [0 792 2 794]
    /NM             (provenance-signing-key)
    /TrnCustomData  ({"trn-annot-listable":"false"
                    ,"key":"67255b06ed0cb394d8e10c0ab2e2909a5eae4835"})
    /F              2
>>
```

FIG. 12

PDF TRACKING FOR LOCAL EDITING AND DIGITAL SIGNING FOR APPLICATIONS

BACKGROUND OF INVENTION

Field of the Invention

This invention provides a method to track PDF documents downloaded from an application, processed locally with form edits and signatures, and then uploaded back into the application with a guarantee that the uploaded PDF document derives from the one downloaded.

Description of Related Art

The Portable Document Format, PDF, is used to produce 'print-like' documents in an electronic format. See PDF 32000-1:2008, Document management-Portable document format (https://opensource.adobe.com/dc-acrobat-sdk-docs/standards/pdfstandards/pdf/PDF32000_2008.pdf), hereby incorporated by reference and hereafter referred to as PDF-32000-1:2008. PDFs are flexible in form: they may contain only static information, or they may contain an interactive form with fields which can be filled in by the end user. These fields are part of a PDF's AcroForm.

FIG. 2 depicts exemplary Simple Agreement 200 between two organizations. The first organization's information is filled in using the fields 210, and the second organization's information is filled in using the fields 220. The document is printed, and the first organization's representative signs at 215, while the second organization's representative signs at 225.

Along with interactive forms, PDFs are used to capture agreements on documents using Digital Signatures. Per the PDF-32000-1:2008 document, page 466:

A digital signature (PDF 1.3) may be used to authenticate the identity of a user and the document's contents. It stores information about the signer and the state of the document when it was signed. The signature may be purely mathematical, such as a public/private-key encrypted document digest, or it may be a biometric form of identification, such as a handwritten signature, fingerprint, or retinal scan. The specific form of authentication used shall be implemented by a special software module called a signature handler. Signature handlers shall be identified in accordance with the rules defined in Annex E.

These signatures are captured on the entire document or by using a Signature type AcroForm field. Optionally, the Signature field can lock other AcroForm fields so they cannot be changed after the signature is captured. PDF Signatures can specify what document modifications are allowed after the signature is captured, including allowing or disallowing annotations. An annotation is a PDF object, like a note, drawing, image, etc., with a location on a page of the PDF document. It provides a way for the user to interact with the document without changing the produced 'print-like' view of the document. See FIG. 3, OPM71 Form 300: this is an example of a U.S. Government form from the Office of Personnel Management used to request time off. The employee can change parts of the form like the fields marked 320 For Accrued Annual Leave and then fill in the dates and hours in fields 325, 330, 335, 340, and 345. They would continue filling in the necessary fields. The employee can then sign the document by creating a Digital Signature using field 310. Their supervisor would sign using field 315.

Figure 1:
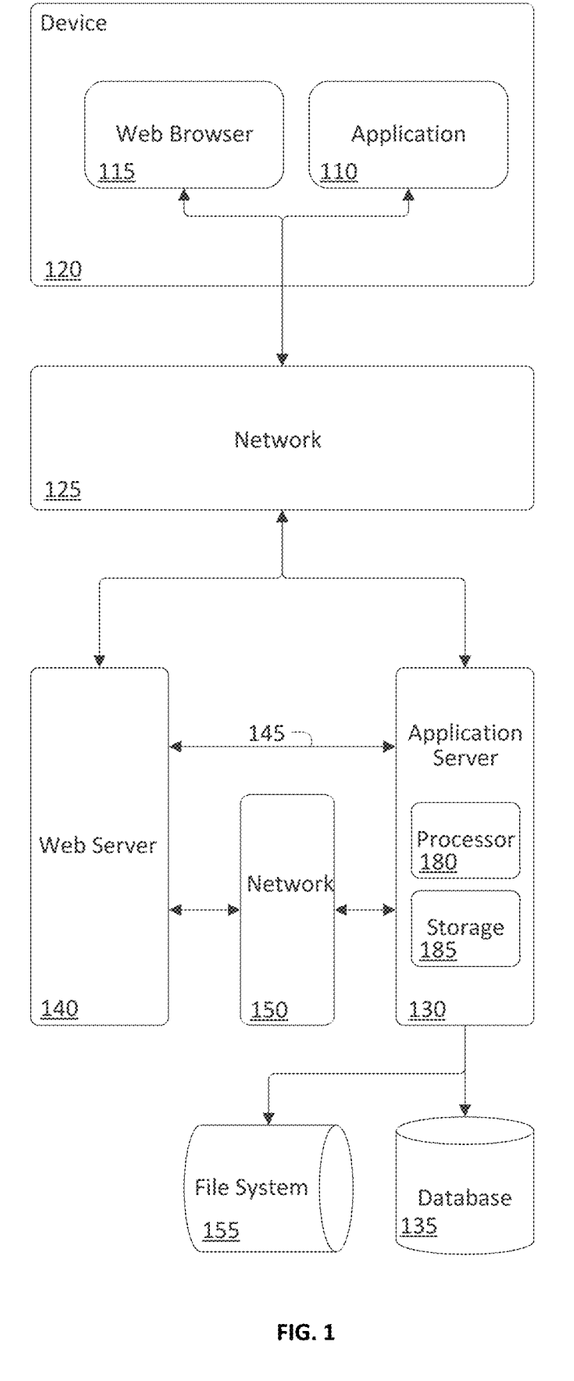
FIG. 1 illustrates a Domain View showing an exemplary overall Domain View of an Application connecting to a Server to manage PDF documents.

Applications exist that produce PDF documents or manage PDF forms. FIG. 1 illustrates a Domain View showing how an application interacts with a user's device 120. The user can use either an Application 110 installed on the device or they can use a Web Browser 115 and then connect either to the Application Server 130 or to the Web Server 140 over a Network 125. The Web Server 140 connects to the Application Server 130 over a Network 150 or direct connection 145. The Application Server 130 stores the managed PDFs in a Database 135 or in a File System 155. Application Server 130 includes at least on processor 180 and tangible non-transitory storage media 185 for storing instructions or other information.

Figure 5:
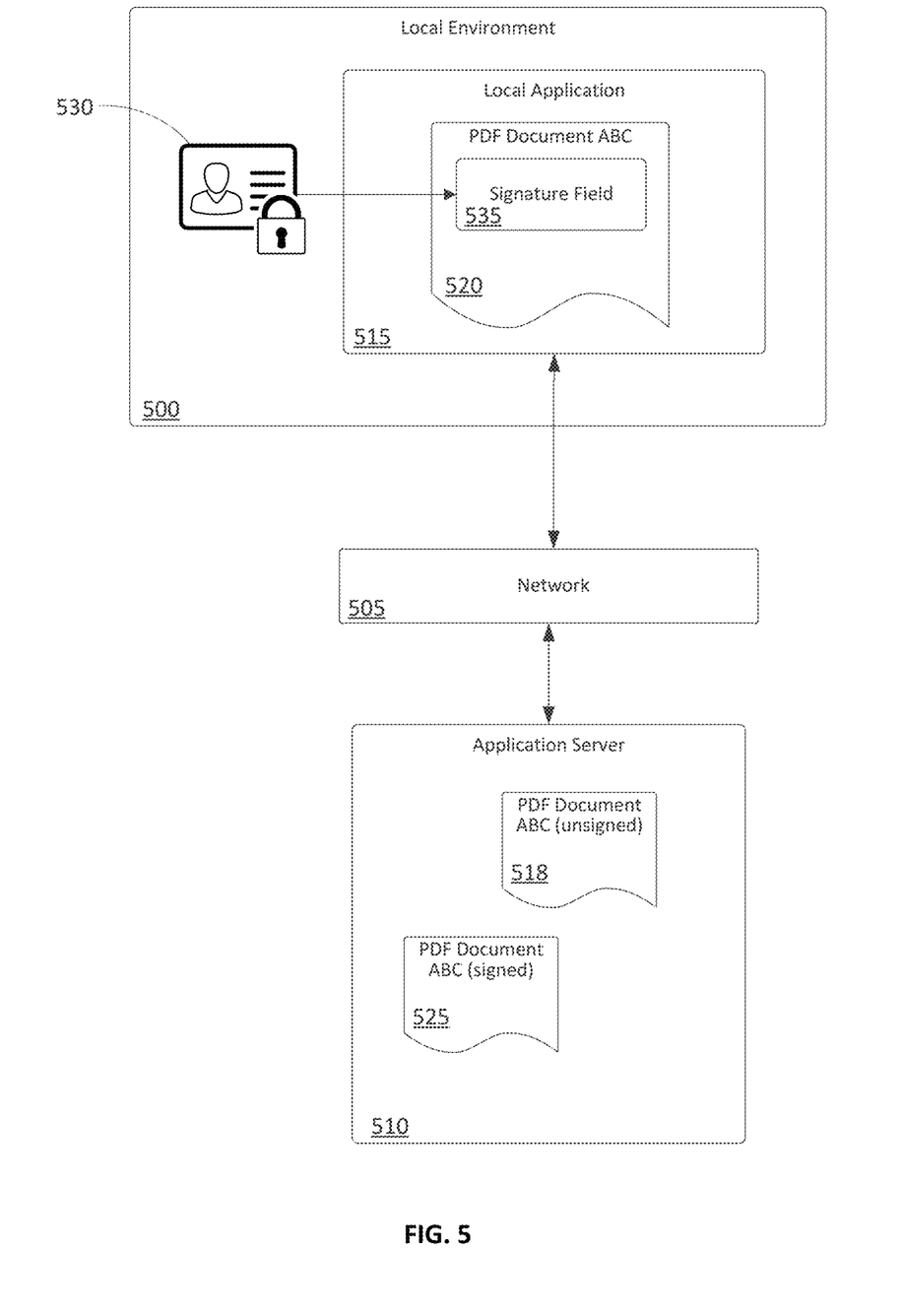
FIG. 5 illustrates an exemplary Secure PDF Digital Signature Application Flow for the user to download a PDF from the Application.

For some Applications, the PDF document must be downloaded to the user's local machine to meet certain requirements, and then uploaded back into the Application. Here are three examples:

(1) In some environments, Digital Signatures are required to use secured certificates on a smart card. Examples of smart cards are Personal Identity Verification (PIV) cards issued by federal agencies or Common Access Cards (CAC) issued by the Department of Defense. Signing certificates are issued to the end user in a secure manner and placed on these cards. These cards are kept secured and the private information on them is kept secure. As the Digital Signature generation requires both the private and public information, this must be done in the users' local environment, so the private information is not transmitted over the network or stored anywhere but on the card. This requirement makes it impossible for an Application Server such as Application Server 130 to generate the Digital Signature: it must be done in the user's local environment. An example of this is shown in FIG. 5. The secure certificate is stored on the user's smart card 530 and the user uses Local Application 515 obtain unsigned PDF Document ABC 518 over network 505 from Application Server 130 and then sign local copy PDF Document ABC 520 using Signature Field 535 in the user's Local Environment 500. Signed PDF Document ABC 520 is then uploaded over Network 505 and stored on the Application Server 510 as Application Server copy of signed PDF Document ABC 525.

(2) The user needs to be able to fill out the form without network connectivity to the Application Server. To do this, the PDF Document is saved locally and then a local PDF Viewer is used to fill in the document.

(3) The Local Application Client is Web-based and doesn't require a local installation. Many organizations cannot install local applications or web browser plugins for security purposes without extensive risk analysis. This is very common in governmental/federal organizations. While some organizations could get waivers or acceptance, this means that the Application would only work on the networks that it's installed upon. Being Web-based enables the Application to work from any connected organization. A local client application could do the Digital Signature in the local user environment, but a Web-based application cannot. Access to the Signing Certificates is prohibited for Web Browsers for security purposes.

Applications exist today that enable the user to download a PDF and make changes to it in their local environment, then upload the PDF back into the Application. However, major issues arise. How can the Application ensure that the uploaded PDF is based upon the previously downloaded PDF? What if the user uploads a different PDF or the wrong version of the downloaded PDF? What if the uploaded PDF is the same PDF 'form' but from a different source, other than the Application?

SUMMARY OF INVENTION

One aspect of the present invention provides a method and system for an Application to track a downloaded PDF in a manner that doesn't affect Digital Signatures and helps to ensure that once the PDF is signed and/or filled and uploaded back to the Application, that the uploaded PDF has the expected provenance.

In one aspect of the invention a method and system are provided to "mark" a PDF document so that its provenance can be checked when uploaded. In this respect, the method and system used to mark must:

Be dynamic. A "mark" that is only done once for a PDF document will not work if multiple revisions of the PDF document must be maintained because each revision would have the same 'mark'.

Not invalidate Digital Signatures on the PDF document. When marking a PDF document that has Digital Signatures already captured, the marking cannot invalidate the existing Digital Signatures.

These requirements eliminate the option of adding hidden text to the PDF document. The way that this can be done that meets these requirements is to ensure that the Signatures allow Annotations and use a Hidden Annotation (see PDF-32000:2008 section 12.5.3, pages 384-85) to mark the PDF. According to an aspect of the invention, a unique key is generated for each PDF Document revision downloaded and the key is stored on the downloaded document's Hidden Annotation. The key can be stored many ways on the Hidden Annotation. For example, in some aspects of the invention, the key is stored in the Contents of the annotation, in a custom object created on the Annotation, or as part of a specialized name that includes the key, or stored in the name (NM) property of the Annotation.

When the PDF Document is uploaded back into the Application Server, then the Hidden Annotation is read, and its stored key must match the key given when the revision was downloaded. If it does not match or the hidden annotation is not found, then the uploaded PDF document is rejected.

In one embodiment of the present invention, there is provided an application server system for verifying the provenance of a candidate Portable Document File. The system includes a processor operably connected to a network and non-transitory computer instruction storage media storing computer instructions. The instructions are configured to cause the processor to receive over a network a request for a Portable Document File from a client user computer; determine whether the request corresponds to a previously generated Portable Document file and transmit the previously generated Portable Document File to the client user computer if so. Otherwise, the instructions generate an integrity key unique to the Portable Document File and the request; encode the integrity key in the Portable Document File in an annotation; encode the annotation to be hidden; store the Portable Document File in a local data store and set a processed flag associated with the integrity key to false; and transmit the Portable Document File to the client user computer. After transmitting the Portable Document File or the previously generated Portable Document File to the client user computer, the instructions receive over the network from the client user computer a candidate Portable Document File and search the candidate Portable Document File for a candidate hidden annotation. If the candidate hidden annotation is found, the instructions extract a candidate key from the candidate hidden annotation and compare it to the integrity key and pass the candidate Portable Document File for further processing and set the processed flag associated with the integrity key to true if the integrity key and candidate key match. If the hidden annotation is not found or the integrity key and candidate key do not match, the instructions transmit a rejection message over the network to the client user computer.

In some embodiments, there is an application server system for verifying the provenance of a candidate electronic file having a processor operably connected to a network and non-transitory computer instruction storage media storing computer instructions. The instructions are configured to cause the processor to receive over a network a request for an electronic file from a client user computer; generate an integrity key unique to the electronic file and the request; encode the integrity key in the electronic file in an annotation; encode the annotation to be hidden; and transmit the electronic file to the client user computer. After transmitting the electronic file to the client user computer, the instructions receive over the network from the client user computer a candidate electronic file; search the candidate electronic file for a candidate hidden annotation. If the candidate hidden annotation is found, the instructions extract a candidate key from the candidate hidden annotation and compare it to the integrity key and mark the candidate electronic file as eligible for further processing if the integrity key and candidate key match. If the hidden annotation is not found or the integrity key and candidate key do not match, the instructions transmit a rejection message over the network to the client user computer.

In some embodiments, the integrity key is at least 64 bits in length and is based on random or pseudo-random data. In some embodiments, the integrity key is at least 128 bits in length. In some embodiments, the electronic document and the candidate electronic document are Portable Document Files. In some embodiments, the hidden annotation is of subtype text and the integrity key is stored in the annotation's contents entry. In some embodiments, after encoding the annotation to be hidden, the instructions store the electronic file in a local data store and set a processed flag associated with the integrity key to false and, if the hidden annotation is found and the integrity key and candidate key match, set a processed flag associated with the integrity key to true.

In another embodiment, there is provided a method for verifying the provenance of a candidate electronic file. The method has steps including receiving over a network a request for an electronic file from a client user computer; generating an integrity key unique to the electronic file and the request; encoding the integrity key in the electronic file in an annotation; encoding the annotation to be hidden; and transmitting the electronic file to the client user computer. After transmitting the electronic file to the client user computer, the method steps include receiving over the network from the client user computer a candidate electronic file; extracting a candidate key from a candidate hidden annotation in the candidate electronic file and executing a true/false comparison of the candidate key with the integrity key; setting a processing eligibility flag equal to the true/false comparison; and transmit an acceptance or rejection message over the network to the client user computer based on the true/false comparison. In some embodiments, the integrity key is at least 64 bits in length and is based on random or pseudo-random data. In some embodiments, the integrity key is at least 128 bits in length; the electronic document and the candidate electronic document are Portable Document Files; the hidden annotation is of subtype text and the integrity key is stored in the annotation's contents entry.

BRIEF DESCRIPTION OF THE DRAWINGS

FIG. 2 illustrates and exemplary Simple Agreement between parties that must be signed.

FIG. 3 illustrates an exemplary form, OPM 71, for requesting leave or approved absence.

DETAILED DESCRIPTION

To meet all the previous requirements, Application Server 130 implements three processes.

Figure 4:
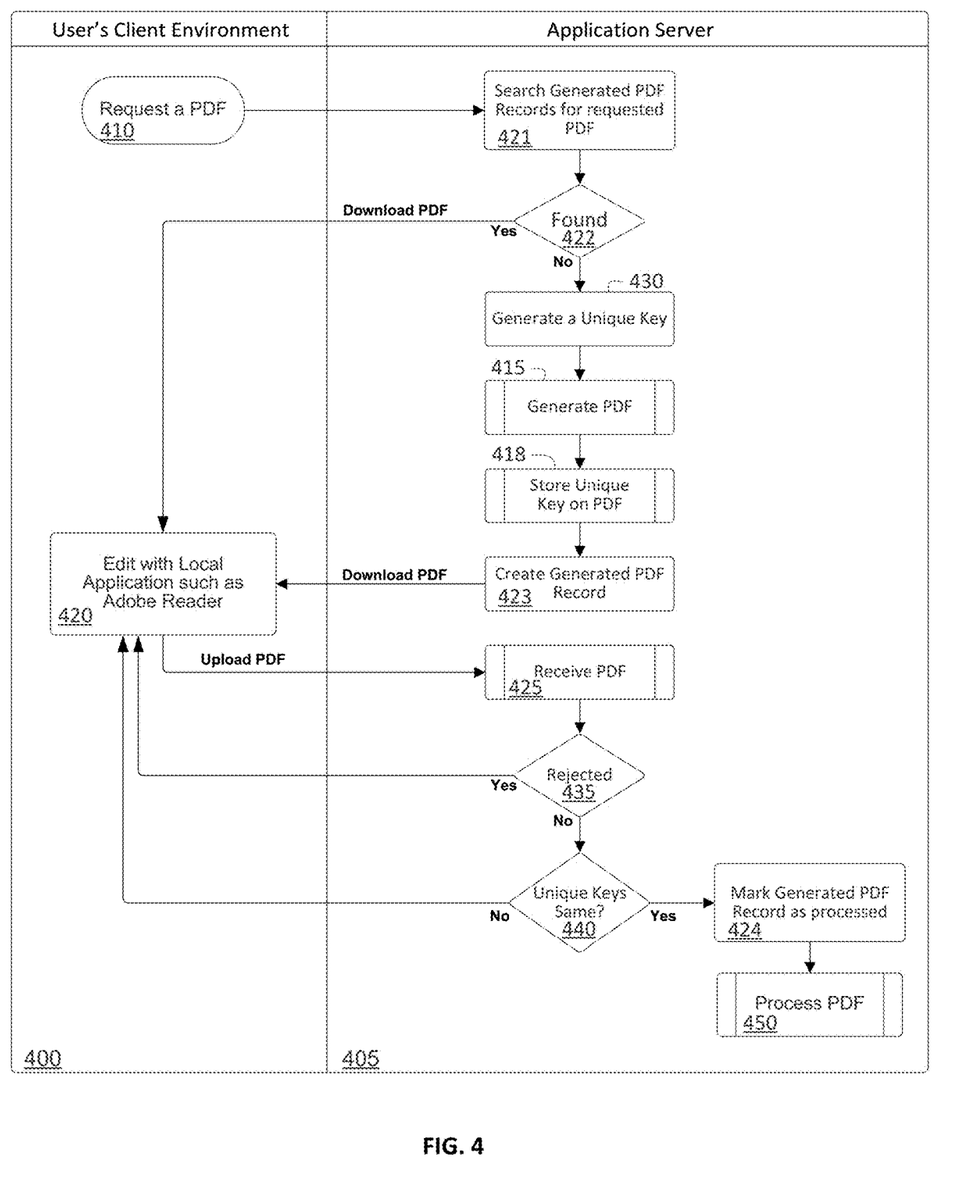
FIG. 4 illustrates an exemplary Application Flow for the user to download a PDF from the Application.

(1) Get Unique Key on PDF
(2) Store Unique Key on PDF
(3) Get Hidden Annotation for Mark With reference to FIG. 4, Application Flow, a user working in User's Client Environment 400 will Request a PDF 410 from the Application Server 405. The Application Server 405, in Search Generated PDF Records step 421, searches table 900 (see FIG. 9) for the requested PDF using the Application's PDF Document Identifier for the requested PDF with Processed field false. If a record was found as tested at step 422, then the Generated PDF contained in the found record is downloaded and the UUID from the record is used as the Unique Key for this process. Otherwise, a Unique Key is generated at step 430. The key can be generated from a Database field that guarantees uniqueness, from a universally unique identifier (UUID) which is a 128-bit label, or by a random number generator. While the probability that a UUID is not duplicated is not zero, it is close enough to zero to be acceptable. Likewise, a randomly generated Unique Key should be of a bit-length sufficiently long to render the probability of a duplicate near zero. A PDF is generated to be downloaded by the end-user with the process Generate PDF called at step 415. The generated PDF has the Unique Key stored on it via a call at step 418 to the Store Unique Key on PDF process (see FIG. 7). The resulting PDF is then stored in the database record at step 423 Create Generated PDF Record (see FIG. 9) by inserting a new record storing the PDF contents, the Application PDF Document Identifier, and the Unique key and setting the Process field to false in table 900. The Generated PDF is then downloaded to the user.

Figure 9:
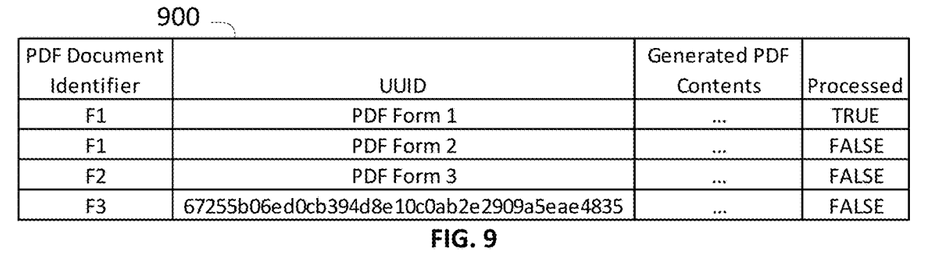
FIG. 9 illustrates an exemplary database table that stores the information about downloaded PDFs, their contents, unique ID, and if it was processed.

At step 420 the user edits the downloaded PDF with a local application such as Adobe Reader potentially changing AcroFields and performing Digital Signatures. When done, the user uploads the PDF to the Application Server 405 which receives it at Receive PDF step 425. Receive PDF step 425 calls the Get Unique Key on PDF process 600 (see FIG. 6). The uploaded PDF is rejected at step 435 if Get Unique Key on PDF process 600 returns Failed. The uploaded PDF is rejected at step 440 if the unique key returned by Get Unique Key on PDF process 600 does not match the unique key stored at step 418 or the UUID in a found record in step 421. If the uploaded PDF is not rejected, then Application Server 405 updates the database, e.g., table 900, and Marks the Generated PDF record as processed at step 424 by setting the processed field to true. Then at step 450, the Process PDF process is called on the uploaded PDF.

Generate PDF 415 and Process PDF 450 are generalized process referencing how the Application Server 405 deals with the managed PDF.

Processes

Get Unique Key on PDF process 600

Figure 6:
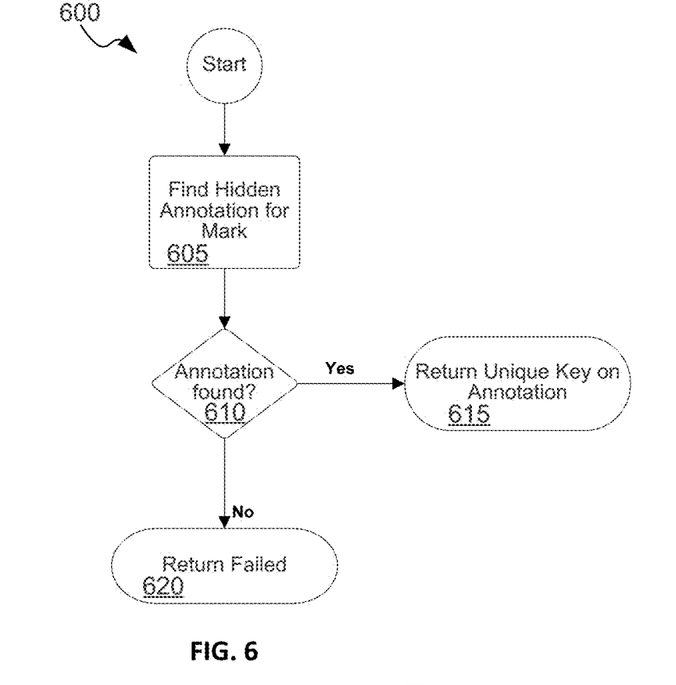
FIG. 6 illustrates an exemplary process to get a unique key on the PDF

With reference to FIG. 6, the process starts and takes as input a PDF document.

Step 605 Find Hidden Annotation for Mark, searches through the PDF document for the Hidden Annotation. The manner of identifying the correct Hidden Annotation depends upon the manner in which it was originally coded and may encompass looking for a specific name for the Annotation, looking for a specific custom Annotation type, or looking for a specific custom object to the Annotation Object.

Figure 10:
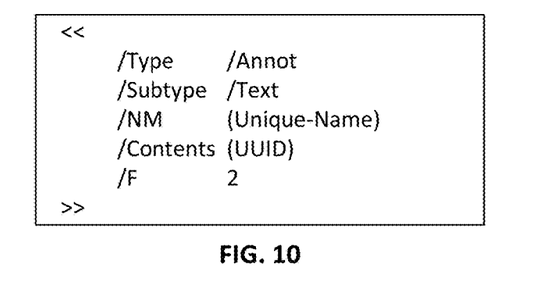
FIGS. 10-12 illustrate exemplary manners for encoding a unique key in a PDF Hidden Annotation.
Figure 11:
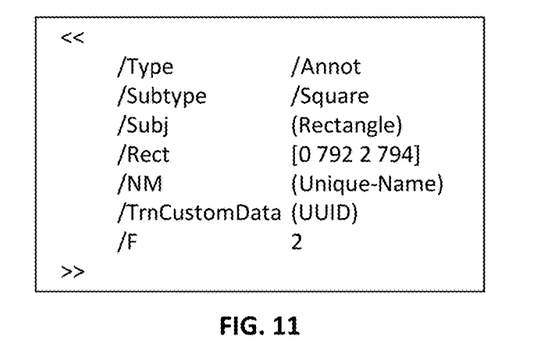
Figure 12:
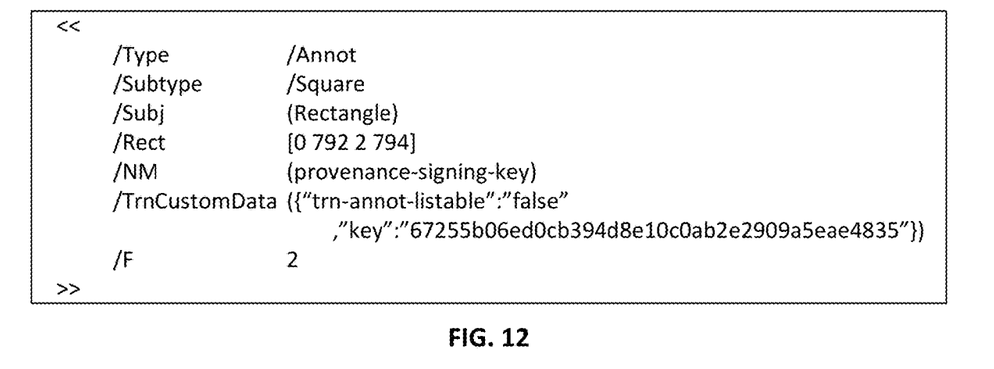

In one embodiment, this may be done by using the /NM (Name) field on the annotation and giving it a unique name for the key. Other embodiments use a custom Annotation type or add a custom field to the Annotation Object such as /TrnCustomData. Three example Annotations are provided in FIGS. 10, 11, and 12. FIG. 10 shows using the /NM field to uniquely name the Hidden Annotation and a Text Annotation is used with the unique key stored in the /Contents. FIG. 11 shows an example using /NM field to uniquely name the Hidden Annotation and using a Rectangle Annotation and a custom Annotation field /TrnCustom Data to contain the unique key. FIG. 12 illustrates using encoding a unique key in a Hidden Annotation using a Rectangle Annotation and a custom Annotation field /TrnCustom Data field containing the unique key as subset of the custom data. In this example, the UUID is stored in the name "key" thus allowing other information to be stored in the /TrnCustomData field. In each example, the annotation is identified and located by way of the /NM field.

If the Annotation found step 610 is yes, then the unique key stored on the annotation by step 710 is returned by step 615 Return Unique Key on Annotation. Otherwise, failed is returned at step 620 Return Failed.

If the example in FIG. 12 were used in a particular implementation, Process 600 would find the Hidden Annotation by searching the PDF for an annotation having the name "provenance-signing-key" and returning 67255b06ed0cb394d8e10c0ab2e2909a5eae4835.

Store Unique Key on PDF Process 700

Figure 7:
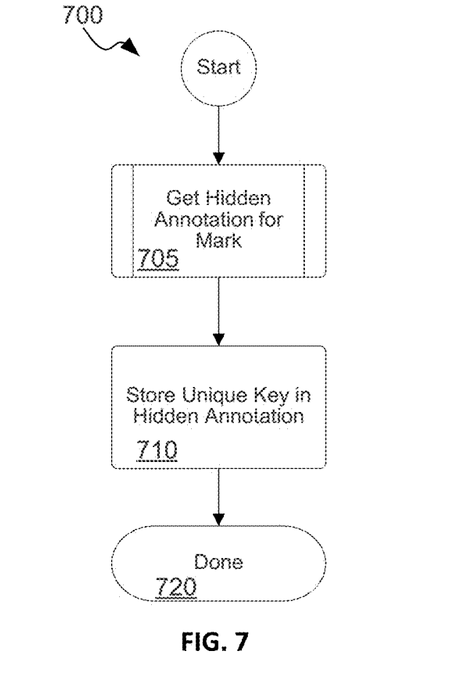
FIG. 7 illustrates an exemplary process to store the unique key on the PDF

With reference to FIG. 7, the process starts and takes as input a PDF document and a unique key.

Step 705 calls the Get Hidden Annotation for Mark process 800 (see FIG. 8) with the PDF document.

Step 710 stores the unique key on the Annotation return from step 705. There are numerous ways to do this, and the invention is not limited to a specific way except as expressly claimed. Examples are described above in connection with the description of step 605.

The process completes at step 720.

Get Hidden Annotation for Mark Process 800

Figure 8:
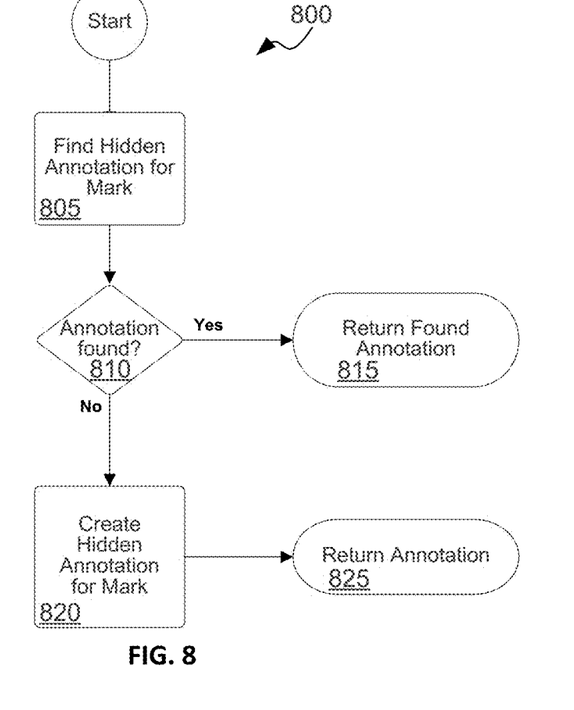
FIG. 8 illustrates an exemplary process that finds the hidden annotation for the mark or creates it if not found.

With reference to FIG. 8, the process starts and takes as input a PDF document.

Step 805 Find Hidden Annotation for Mark, searches through the PDF document for the Hidden Annotation used by this algorithm. Many ways of identifying the correct Hidden Annotation are possible and the invention is not limited to a specific way unless expressly claimed. Examples are described above in connection with the description of step 605.

If the Annotation found step 810 is yes, then the found Annotation is returned at step 815 Return Found Annotation. Otherwise, Create Hidden Annotation for Mark step 820 creates an Annotation in the PDF document, flags it as Hidden, and identifies it for lookup by steps 805 and 605.

Step 825 Return Annotation returns the Annotation created by step 810.

With reference to FIG. 9, Table 900 is an exemplary table for storing information about downloaded PDFs, their contents, unique ID, and if it was processed.

What is claimed is:

1. An application server system for verifying the provenance of a candidate Portable Document File comprising:
   a processor operably connected to a network and non-transitory computer instruction storage media storing computer instructions configured to cause the processor to:
   receive over a network a request for a Portable Document File from a client user computer;
   determine whether the request corresponds to a previously generated Portable Document file and transmit the previously generated Portable Document File to the client user computer if so; otherwise:
   generate an integrity key unique to the Portable Document File and the request;
   encode the integrity key in the Portable Document File in an annotation;
   encode the annotation to be hidden;
   store the Portable Document File in a local data store and set a processed flag associated with the integrity key to false; and
   transmit the Portable Document File to the client user computer;
   after transmitting the Portable Document File or the previously generated Portable Document File to the client user computer:
   receive over the network from the client user computer a candidate Portable Document File;
   search the candidate Portable Document File for a candidate hidden annotation;
   if the candidate hidden annotation is found, extract a candidate key from the candidate hidden annotation and compare it to the integrity key and pass the candidate Portable Document File for further processing and set the processed flag associated with the integrity key to true if the integrity key and candidate key match;
   if the hidden annotation is not found or the integrity key and candidate key do not match, transmit a rejection message over the network to the client user computer.

2. An application server system for verifying the provenance of a candidate electronic document comprising:
   a processor operably connected to a network and non-transitory computer instruction storage media storing computer instructions configured to cause the processor to:
   receive over a network a request for an electronic document from a client user computer;
   generate an integrity key unique to the electronic document and the request;
   encode the integrity key in the electronic document in an annotation;
   encode the annotation to be hidden; and
   transmit the electronic document to the client user computer;
   after transmitting the electronic document to the client user computer:
   receive over the network from the client user computer a candidate electronic document;
   search the candidate electronic document for a candidate hidden annotation;
   if the candidate hidden annotation is found, extract a candidate key from the candidate hidden annotation and compare it to the integrity key and mark the candidate electronic document as eligible for further processing if the integrity key and candidate key match;
   if the hidden annotation is not found or the integrity key and candidate key do not match, transmit a rejection message over the network to the client user computer.

3. The system of claim 2 wherein the integrity key is at least 64 bits in length and is based on random or pseudo-random data.

4. The system of claim 2 wherein the electronic document and the candidate electronic document are Portable Document Files.

5. The system of claim 4 wherein the hidden annotation is of subtype text and the integrity key is stored in a content entry of the annotation entry.

6. The system of claim 4 wherein the computer instructions are further configured to cause the processor to:
   after encoding the annotation to be hidden, store the electronic file in a local data store and set a processed flag associated with the integrity key to false; and
   if the hidden annotation is found and the integrity key and candidate key match, set a processed flag associated with the integrity key to true.

7. A method for verifying the provenance of a candidate Portable Document File (PDF) document comprising the steps of:
   receiving over a network a request for a PDF document from a client user computer;
   generating an integrity key unique to the PDF document and the request;
   encoding the integrity key in the PDF document in a content entry of an annotation of subtype text;
   encoding the annotation to be hidden; and
   transmitting the PDF document to the client user computer;
   after transmitting the PDF document to the client user computer:
   receiving over the network from the client user computer a candidate PDF document;
   extracting a candidate key from a candidate hidden annotation in the candidate PDF document and executing a true/false comparison of the candidate key with the integrity key;

setting a processing eligibility flag equal to the true/false comparison;

transmitting an acceptance or rejection message over the network to the client user computer based on the true/false comparison.

8. The method of claim 7 wherein the integrity key is at least 64 bits in length and is based on random or pseudo-random data.

* * * * *